United States Patent Office 3,383,175
Patented May 14, 1968

3,383,175
PRODUCTION OF CARBON BLACK
Merrill E. Jordan, Walpole, and William Gerald Burbine, Whitman, Mass., assignors to Cabot Corporation, Boston, Mass., a corporation of Delaware
No Drawing. Filed Jan. 21, 1966, Ser. No. 522,022
9 Claims. (Cl. 23—209.4)

The present invention relates generally to the production of carbon black and more specifically to a novel method for controlling the properties of carbon black.

Commercially, carbon black is produced by the thermal decomposition or incomplete combustion of carbon containing materials which are essentially hydrocarbon in nature. The decomposition of the carbonaceous material can be achieved by various processes such as open flame decomposition (impingement or channel), enclosed direct flame decomposition (furnace), or heat decomposition (thermal). The basic properties of a black and therefore the performance characteristics exhibited thereby in applications thereof are determined in large measure by the particular process by which it is produced. For instance, channel blacks are generally characterized by high surface area, low structure, high volatile content and low pH. Thermal blacks, on the other hand, often exhibit very low surface area, low structure, low volatile content and high pH. Furthermore, within the limitations of each of the carbon black processes, further control of product qualities can be had by choice of fuels, feedstocks, and reaction conditions. Thus, particular carbon blacks are produced for different applications.

Despite the fact that, by utilizing and manipulating the variables mentioned above, the properties of a produced black may be varied and reasonably predicted or controlled, there are still intrinsic variables, e.g., changes in the quality of the raw material, which render difficult precise control of the ultimate properties of the final product produced. This is especially true when a carbon black is produced for some specific application and must consistently, uniformly and within very narrow tolerances impart a certain property or set of properties to the products in which it is used. Accordingly, it is most desirable and valuable to have simple, independent methods of controlling and adjusting the properties of the carbon black products so as to permit the controlled production of a product of predetermined properties or a product having certain properties precisely and selectively modified.

It is a principal object of the present invention to provide a novel process for controlling properties of carbon black.

A further object of the present invention is to provide a simple process for compensating for variables in carbon black producing processes so as to avoid serious deviations in quality of the black produced.

Still another object of the present invention is to provide a process whereby a carbon black may be produced which consistently and within narrow tolerances exhibits predetermined properties.

Still other objects and advantages of the present invention will in part be obvious and will in part appear hereinafter.

In accordance with the present invention it has been discovered that properties of a carbon black can be controlled by introducing into the carbon black forming zone relatively minor amounts of a material comprising rare earth metals.

By "rare earth metal" is meant any of the elements forming part of the lanthanide series of elements (atomic numbers 57–71 of the Mendeleev Periodic Table). Said rare earth metals can be introduced into the carbon forming zone in the elemental state or in chemical combination. Generally speaking, said metals can be handled most easily and conveniently in the form of chemical compounds thereof. For instance suitable materials which are compounds may be inorganic such as the chlorides, sulfates, ammonium salts, carbonates, nitrates, etc.; or organic such as oxalates, citrates, acetates, stearates, alkyls, aryls, etc. Specific examples of suitable rare earth metal compounds are: lanthanum sulfate, lanthanum oxalate, holmium nitrate, samarium carbonate, cerium nitrate, tetra-i-propoxy cerane, neodymium acetate, europium ammonium nitrate, tricyclopentadienyl praseodymium, tricyclopentadienyl neodymium, etc. It should be noted that mixtures of rare earth metal compounds and particularly mixtures of the inorganic and organic acid salts thereof are presently generally more easily obtainable and are thus usually more economical to utilize than pure compounds. Since said mixtures offer such obvious economic advantages they will normally be preferred. The acid salt mixtures are known generically as "rare earth salts" or "didymium salts," the latter type of mixture being distinguishable from the former by the absence therein of cerium compounds.

The amount of rare earth metal material introduced into the carbon black forming zone can vary substantially depending upon the particular metal(s) or metal compound(s) utilized, the extent of carbon black property modification desired, etc. Thus the exact amount of a particular material to be utilized can generally be best determined during operations. It has been found, however, that in order to provide significant changes in the carbon black properties, at least about 0.2 milligram atoms and preferably more than about 2 milligram atoms of the metal should be introduced into the carbon black forming zone per mole of carbon in the hydrocarbon feedstock. Practically speaking, the maximum amount of rare earth metal addition is circumscribed only by the maximum amount of residual metal which can be tolerated on the black. Obviously, this consideration will be dictated, to a large extent, by the intended use of the black. Thus, there is no well defined upper limit of addition. Usually however, addition of greater than about 50 milligram atoms of the rare earth metal per mole of hydrocarbon feedstock carbon provides little or no further change in desirable properties.

The analysis of the quantity of carbon available in a particular feedstock hydrocarbon can be effected in any suitable manner. For instance said analysis can be suitably effected by complete oxidative pyrolysis of a sample of a feedstock and determining the amounts of gaseous carbon products thus formed by gas chromatography or any other suitable analytical procedure.

The exact mode of entry of the rare earth metal material into the carbon forming zone is generally not critical. For instance, said material can be introduced into said zone as a member of any one of the streams normally introduced into said zone such as the hydrocarbon feedstock, the combustion air or the fuel gas streams. Obviously, said material can also be introduced as a separate stream. It should be noted, however, that care must be taken to introduce the rare earth metal into the carbon black producing reaction zone. If said precaution is not taken, for instance, if the rare earth metal containing material is introduced into a carbon black producing furnace downstream the carbon black forming zone, little or no change or control of the carbon black properties will be realized.

Since control of carbon black properties can be achieved with relatively minor additions of the lanthanide rare earth metal material it will be obvious to those skilled in the art that generally it will be preferred to dilute said metal material in order to provide a more easily controllable rate of addition thereof. Thus, the material can be dissolved or dispersed in a carrier fluid such as the hydrocarbon feedstock or fuel gas and thereafter precisely dispensed into the carbon forming zone. In addition, the material can be dispersed or dissolved in a water carrier.

There follow a number of illustrative non-limiting examples:

Example 1

A carbon black furnace is operated at about 60 gallons per hour of an aromatic concentrate extracted from the recycle stock from a petroleum refinery cracking operation. The properties of this feedstock are given in the following table.

| | |
|---|---|
| Specific gravity, 60° F./60° F | 1.0695 |
| Viscosity at 130° F., SSU | 600 |
| Viscosity at 210° F., SSU | 72 |
| Asphaltenes content, percent | 0.76 |
| Ash content, percent | 0.007 |
| H/C ratio | 1.14 |
| Molecular weight factor | 227 |
| Initial boiling point (ASTM) ° F | 570 |
| 50% distilled boiling point (also cracking point) ° F. | 663 |
| Moles carbon/gallon (gm.-moles/gal.) | 312 |

The above feedstock is preheated to 500° F. and is introduced axially into the cylindrical reaction zone of the furnace through an air-atomizing spray nozzle located at the center of the upstream end of said furnace. The atomized feedstock was decomposed with the aid of a turbulent combustion reaction maintained by six jets of natural gas introduced through six separate orifices equally spaced concentrically around the atomization nozzle at a rate of about 3000 s.c.f./h. and a stream of air entering the annular space surrounding the gas jets through a spiral scroll at the same end of the furnace at about 54,000 s.c.f./h. Operating under these conditions a standard high structure type furnace black is produced at a rate of about 215 lbs./hr. having an average nigrometer scale of about 88 and an oil absorption factor of about 165. When compounded in rubber said black results in a cured stock characterized by modulus values between 120% and 130% of the control standard for the grade in question.

Without change in any equipment or other operating conditions, the introduction into the hydrocarbon feedstock liquid immediately ahead of the atomization nozzle of 23 liters per hour of an aqueous solution comprising about 480 gm. lanthanum trichloride per liter reduced the rubber modulus values imparted by the resulting black to between about 95 and about 100% of the control without causing the other rubber properties of the black, such as ultimate tensile strength, abrasion resistance, rebound, etc., to deviate from satisfactory levels or appreciably affecting the yield and rate of production of black from the hydrocarbon feedstock. In addition, the nigrometer scale of the black is reduced to about 80 and the oil absorption factor is reduced to about 110.

Calculated from the above data the lanthanum chloride solution added in the above run provides lanthanum to the carbon black forming zone at a rate of about 2.5 milligram-atoms per mole of hydrocarbon feedstock carbon.

Essentially the same results were obtained in the above example when the lanthanum chloride solution was carried into the furnace by either the air of the natural gas stream injected into the burner, or when the rare earth metal solution was injected by itself directly into the carbon black forming zone of the furnace.

Substantially the same benefits can be obtained in the above example by using in place of the lanthanum chloride solution, an aqueous solution of didymium chlorides in amounts sufficient to provide rare earth metals to the reaction zone of the furnace at a rate of 5 mg.-atoms of rare earth metal per mole hydrocarbon feedstock carbon.

The blacks made with the specified metal additives also tend to be slower curing and less scorchy in rubber compositions than the control blacks.

Example 2

The carbon black furnace of Example 1 is again operated on the same feed tar under the same general set of conditions both with and without the addition of about 25 liters per hour of an aqueous solution comprising about 450 grams/liter of mixed rare earth metal nitrates. The rare earth metal distribution of said nitrate mixture is represented as follows:

| | Percent |
|---|---|
| Lanthanum | 24 |
| Cerium | 48 |
| Praseodymium | 6 |
| Neodymium | 19 |
| Samarium | 2 |
| Gadolinium | 0.5 |
| Other | 0.5 |

The rubber modulus properties of the black are changed substantially by the addition of the nitrate solution.

The lowered modulus and scorch properties in rubber of the black made in the presence of rare earth metal greatly broadens its usefulness compared to the control black. For example it permits the use of higher loading of black in a given polymer to produce a rubber stock of a given type without causing excessive heat generation or other processing or operating difficulties. Alternatively when used at the same loading as the control black, the modified black of the instant invention produces softer and lower hysteresis stocks with greater freedom from flex cracking.

Essentially the same results are obtained in the above example when using amounts of rare earth metals equal to that specified but adding it in other forms, e.g. as the mixed rare earth acetate or oxalate in methanol solution, as a solution of the sulfate or chloride in water or alcohol.

When the above example is repeated with the exception that distilled water is utilized instead of the mixed rare earth salt solution, substantially no change occurs in the carbon black properties.

The above examples, illustrative in nature, broadly represent the types of improvements and accomplishments which can be achieved through the practice of the present invention. Nevertheless, only a few of the many combinations of variables involved in making carbon blacks according to the modified processes of the present invention are shown. In addition to those explicitly stated above, many other possible changes (e.g. in feed materials, reaction zone design, form of introduction of the metal material, types of carrier, etc.) as well as alternative conditions of operation which would constitute other specific embodiments of the invention, will be obvious to those skilled in the art. In fact, it has been found that some of the advantages of this invention are normally always obtained regardless of the exact type of hydrocarbon make fluid used or other details of operation provided only that the concentration of metal is maintained at at least about .2 milligram-atoms/mole hydrocarbon feedstock carbon and that said metal is introduced into the carbon forming zone. For instance, many of the advantages expressly shown in the above examples which relate specifically to the oil furnace process can also be realized in other carbon black producing processes such as the gas furnace, thermal or channel process.

What is claimed is:

1. In a process for producing carbon black by the decomposition of an essentially hydrocarbon feedstock in a carbon black forming zone, the improvement which comprises controlling properties of the carbon black produced by introducing into said carbon forming zone a material comprising a rare earth metal having an atomic number of 57 to 71 in an amount sufficient to provide at least about 0.2 milligram atoms of said metal per mole of hydrocarbon feedstock carbon.

2. The process of claim 1 wherein the amount of rare earth metal introduced into the reaction zone represents at least about 2.0 milligram atoms per mole of hydrocarbon feedstock carbon.

3. The process of claim 1 wherein said material is a mixture of rare earth metal salts.

4. The process of claim 1 wherein said rare earth metal is lanthanum.

5. The process of claim 1 wherein said rare earth metal is cerium.

6. The process of claim 1 as applied to the furnace process for producing carbon black.

7. The process of claim 6 wherein said furnace process is the oil furnace process and said rare earth metal material is introduced into the fluid hydrocarbon feedstock stream.

8. The process of claim 1 as applied to the thermal process for producing carbon black.

9. The process of claim 1 wherein said material comprising said rare earth metal is introduced into said reaction zone as a solution or dispersion thereof.

References Cited
UNITED STATES PATENTS

| | | | |
|---|---|---|---|
| 3,010,794 | 11/1961 | Friauf et al. | 23—209.4 |
| 3,206,285 | 9/1965 | Johnson | 23—209.4 |
| 3,306,762 | 2/1967 | Ruble | 23—209.4 X |

EDWARD J. MEROS, *Primary Examiner.*